(12) United States Patent
Hugger et al.

(10) Patent No.: US 11,673,813 B2
(45) Date of Patent: Jun. 13, 2023

(54) METHODS AND APPARATUS FOR SYNTHESIS AND MAGNETOPHORETIC FRACTIONIZATION SIZE-SELECTION OF MAGNETIC NANOPARTICLES FROM A SOLUTION

(71) Applicant: Vadient Optics, LLC, Beaverton, OR (US)

(72) Inventors: Peter G Hugger, Eugene, OR (US); Chad N Teters, Eugene, OR (US); Thomas L Allen, Eugene, OR (US); Ernst Adrian Henle, Eugene, OR (US); Peter J Polesnak, Eugene, OR (US)

(73) Assignee: VADIENT OPTICS, LLC, Beaverton, OR (US)

( * ) Notice: Subject to any disclaimer, the term of this patent is extended or adjusted under 35 U.S.C. 154(b) by 0 days.

(21) Appl. No.: 16/909,533

(22) Filed: Jun. 23, 2020

(65) Prior Publication Data
US 2022/0135423 A1    May 5, 2022

(51) Int. Cl.
| C01G 49/00 | (2006.01) |
| C09D 11/322 | (2014.01) |
| C09D 11/037 | (2014.01) |
| B33Y 70/00 | (2020.01) |
| B33Y 40/10 | (2020.01) |

(52) U.S. Cl.
CPC .......... *C01G 49/0063* (2013.01); *B33Y 40/10* (2020.01); *B33Y 70/00* (2014.12); *C09D 11/037* (2013.01); *C09D 11/322* (2013.01); *C01P 2004/64* (2013.01); *C01P 2006/42* (2013.01)

(58) Field of Classification Search
None
See application file for complete search history.

(56) References Cited

FOREIGN PATENT DOCUMENTS

WO    WO-2021010990 A1 *   1/2021   .......... B29C 64/165

* cited by examiner

*Primary Examiner* — Colin W. Slifka
(74) *Attorney, Agent, or Firm* — Alleman Hall Creasman & Tuttle LLP

(57) ABSTRACT

Methods and apparatus for producing a magnetic nanoparticle suitable for additive manufacturing techniques includes providing a solution having a plurality of metallic precursors to produce magnetic nanoparticles, a coordinating solvent, and a chelating agent. The solution is mixed and heated to grow nanoparticles wherein magnetic nanoparticles are formed. The solution is then cooled and a magnetic field is applied to the solution wherein ferrite nanoparticles are at least partially separated by size.

23 Claims, 5 Drawing Sheets

METHODS AND APPARATUS FOR SYNTHESIS AND MAGNETOPHORETIC FRACTIONIZATION SIZE-SELECTION OF MAGNETIC NANOPARTICLES FROM A SOLUTION

STATEMENT OF GOVERNMENT INTEREST

This invention was made with government support under contract N00178-17-C0021 awarded by the NAVY. The government has certain rights in the invention.

REFERENCE TO RELATED APPLICATIONS

Not Applicable

TECHNICAL FIELD OF THE DISCLOSURE

The present invention relates in general to processes and manufacture of nanomaterials. The invention relates in particular to apparatus and methods of producing size and composition tuned additively manufactured magneto-dielectric composites.

DISCUSSION OF BACKGROUND

Nanoparticles are produced in a variety of ways including gas condensation, attrition, chemical precipitation, ion implantation, pyrolysis and hydrothermal synthesis. For applications that require a uniform nanoparticle size, precise growth of the nanoparticles is required. The present disclosure offers another approach.

SUMMARY OF THE DISCLOSURE

A method of producing a magnetic nanoparticle suitable for additive manufacturing techniques is disclosed herein. One such method includes providing a solution having a plurality of metallic precursors to produce magnetic nanoparticles, a coordinating solvent, and a chelating agent; mixing and heating the solution to grow nanoparticles wherein magnetic nanoparticles are formed; cooling the solution; and applying a magnetic field to the solution, wherein the ferrite nanoparticles are at least partially separated by size.

BRIEF DESCRIPTION OF THE DRAWINGS

The accompanying drawings, which are incorporated in and constitute a part of the specification, illustrate preferred methods and embodiments of the present invention. The drawings together with the general description given above and the detailed description of preferred methods and embodiments given below, serve to explain principles of the present invention.

DETAILED DESCRIPTION OF THE INVENTION

Figure 1:
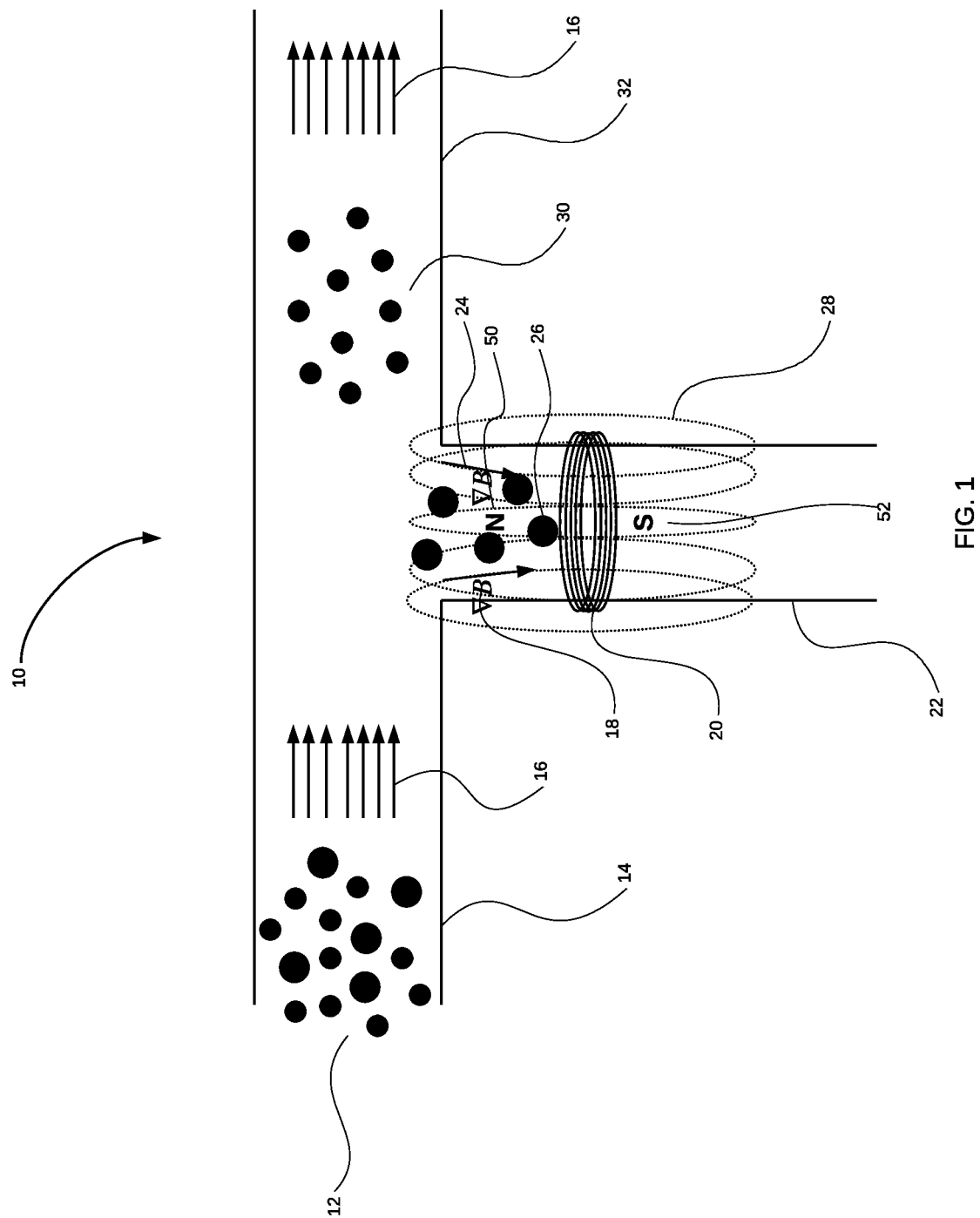
FIG. 1 is a schematic diagram of an example embodiment of the present disclosure wherein a magnetic field is applied to a flowing solution with magnetic nanoparticles.

Referring now to the drawings, wherein like components are designated by like reference numerals. Methods and embodiments of the present invention are described further hereinbelow.

Referring to FIG. 1, wherein a FIG. 1 is a schematic diagram of an example embodiment for a setup for a separation of particles using magnetic fractionation 10. An initial well-mixed working dispersion 12 flows beginning at the null magnetic flux region 14 where the well-mixed working dispersion 12 containing a size distribution of magneto-dielectric nanoparticles which are carried forward by drag forces within a laminar flow 16 of the solvent. The laminar flow 16 carries the well-mixed working dispersion forward towards a magnetic flux region where the well-mixed working dispersion 12 feels both laminar flow drag forces and an orthogonal magnetic attraction 24 by means of magnetic flux condition 18 from a magnetic flux gradient 28, creating an extraction rate proportional to the sum of forces acting on each particle. A vertically fractionated population 28 may further be separated by physical means. The orthogonal magnetic attraction 18 may be facilitated by a permanent magnet creating a north pole 50 and a south pole 52. The orthogonal magnetic attraction 18 may also be facilitated by an electromagnet having current running through the coils 20. The vertically fractionated nanoparticles 26 maybe be collected at a size-selected component 22. Collection of the vertically fractionated nanoparticles 26 at the size-selected component 22 may be via physical means. A complementary population of nanoparticles 30 may be collected at a non-fractionated end 32.

Figure 2:
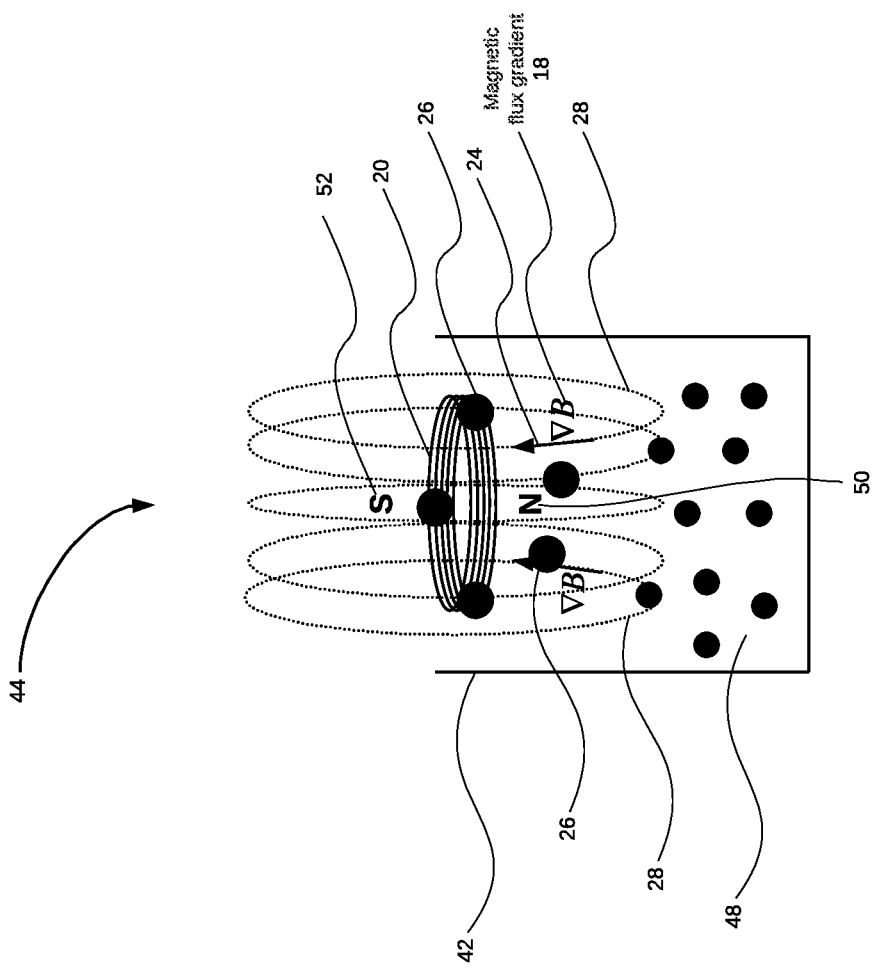
FIG. 2 is a schematic diagram of an example embodiment of the present disclosure wherein a magnetic field is applied to a solution.
Figure 2:
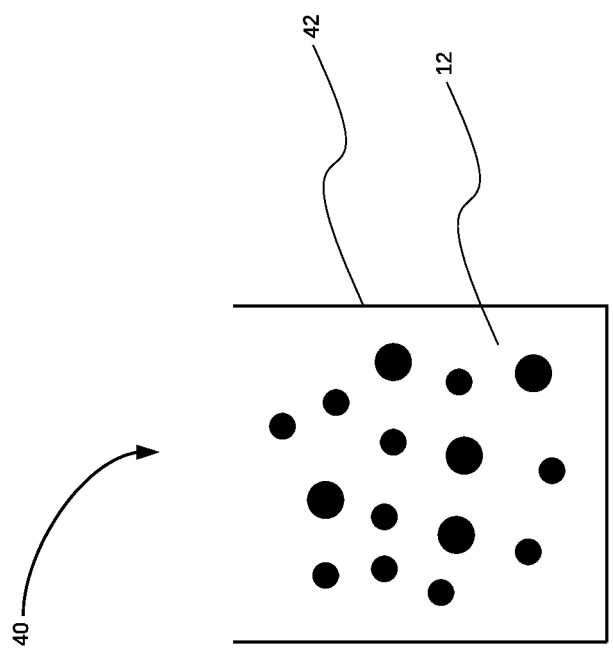

Referring to FIG. 2, wherein FIG. 2 is a schematic diagram of an example embodiment of a well-mixed working dispersion 12 placed in a zero flow velocity container 42 where the well-mixed working dispersion 12 is subject to zero laminar flow. Examples of zero laminar flow comprise the lack of active stirring or pumping of the well-mixed working dispersion 12. FIG. 2 shows example setups for zero flow setup without a magnet 40 and zero flow setup with a least one magnet 44. A permanent magnet or an electromagnet may be placed in or near the zero flow velocity container 42. When electric current runs through an electromagnetic coil 20 a north pole 52 and south pole 50 are produced causing a well-mixed working dispersion 12 to feel a magnetic attraction 24 by means of magnetic flux condition 18 from a magnetic flux gradient 28. The permanent magnet or electromagnet may be positioned inside the zero flow container 42 so that the axis between north pole 52 and south pole 50 is orthogonal to the bottom of the zero flow container 42 thereby causing fractionated nanoparticles 26 to be vertically fractionated. The magnetic coils 20 may further be rotated such that the orientation of the axis between north pole 52 and south pole 50 is not orthogonal to the base of the zero flow velocity container 42 thereby creating a fractionated population of nanoparticles 26 that are separated from complementary population of nanoparticles 48 in a non-vertical manner. Variations in the permanent magnet or electromagnet are determined by the end-user for purposes of collecting and separating nanoparticles.

Figure 3:
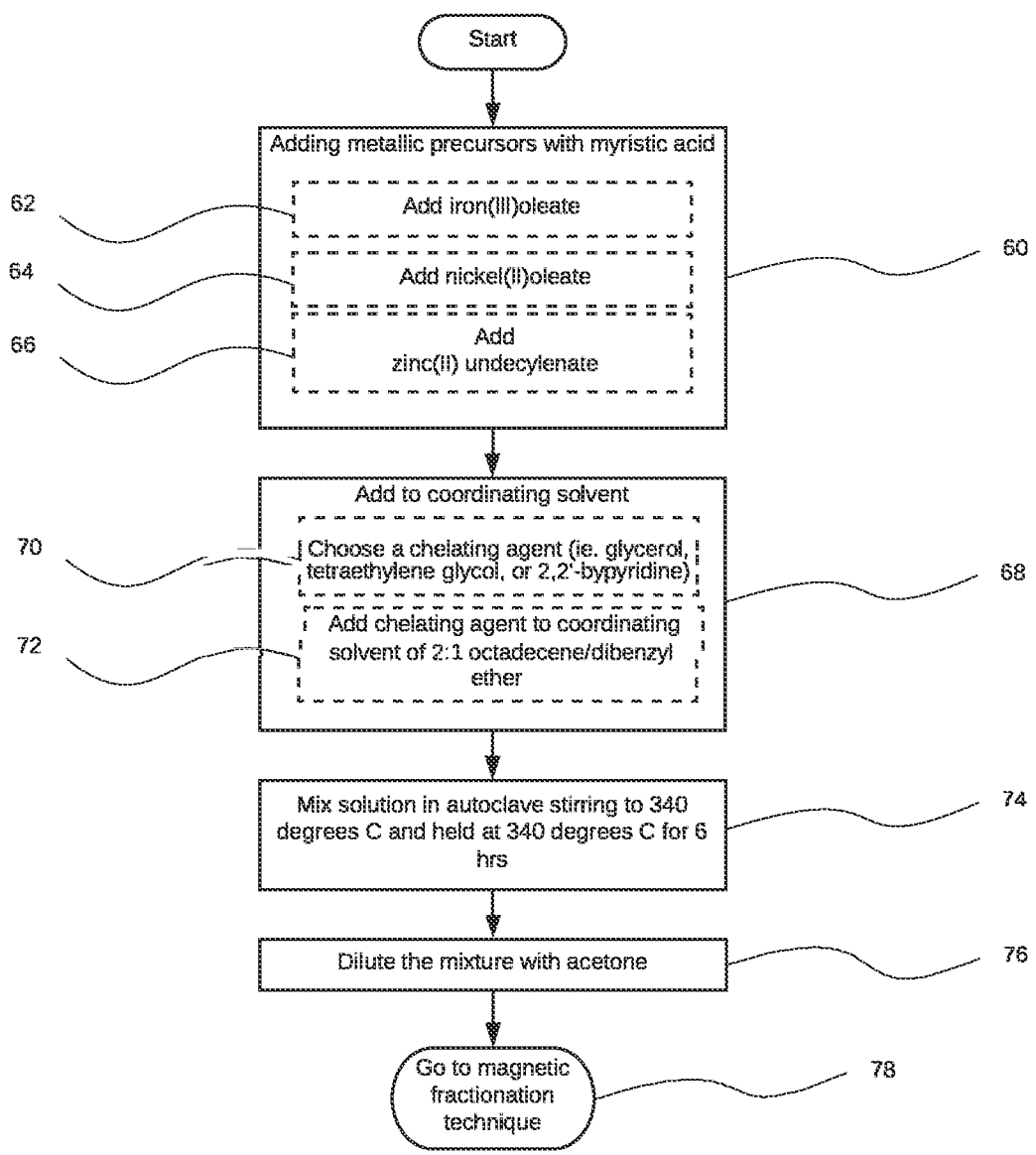
FIG. 3 is a flowchart providing a method of producing solubilized NZFO nanoparticles.

Referring to FIG. 3, FIG. 3 is a flowchart showing a method of producing solubilized $Ni_xZn_{1-x}Fe_2O_4$ (NZFO) nanoparticles over the size range of initial seeding nm diameter up to approximately 100 nm in diameter, including the critical pseudosingle-domain (PSD) size of approximately 60 nanometers suitable for additive manufacturing techniques and low loss radio-frequency applications. In particular, step 60 comprises providing a solution having a plurality of metallic precursors with myristic acid. Adding metallic precursors in 60 comprises adding iron(III) oleate 62, adding nickel(II) oleate 64, and adding zinc(II) undecylenate 66. The adding of these metallic precursors to myristic acid promotes solubilizing surface functionality. Step 68 is the adding of the solution in step 60 to a coordinating solvent. A chelating agent is chosen in step 70 which may comprise of glycerol, tetraethylene glycol, or 2,2'-bypyridine or another chelating species. The chelating agent in step 70 is added to a coordinating solvent mixture of olefinic hydrocarbon and ethereal solvent in step 72 to stabilize precursor metal ions in solution which results in more controlled particle growth resulting in larger particles with narrower size distributions. The metal cations as well as the chelator are added in ratios to produce the desired alloying ratios x in the final $Ni_xZn_{1-x}Fe_2O_4$ product. In step 74, the solution is mixed in an autoclave and heated up to a final temperature in the 280-340 degrees C. range at a rate of 2-5 degrees C. per minute and held at this reaction temperature for 4-12 hours. The reaction can be run up to about 350 degrees C., but some solvents may break down at further increased temperatures. The exact ramp rate and holding temperate can be different than those described above. The holding temperate can be adjusted based on the ramp rate and holding temperate. The solution is further mixed and heated to grow nanoparticles wherein magnetic nanoparticles are formed. Subsequent steps may include cooling and further applying a magnetic field for fractionation of nanoparticles formed in the solution and subsequent growth reactions with the products of previous reactions in order to produce particles of increasing size. In step 76, the solution or mixture is allowed to cool and diluted with polar solvent. Additionally, the solution or mixture in step 76 may also be diluted with polar solvent before allowed to cool. In step 78, the solution or mixture is now considered a well-mixed working dispersion 12 as mentioned in FIGS. 1 and 2 and may be transferred to a magnetic fractionation technique 78 or may further receive additional processing steps in preparation for a magnetic fractionation technique 78.

Figure 4:
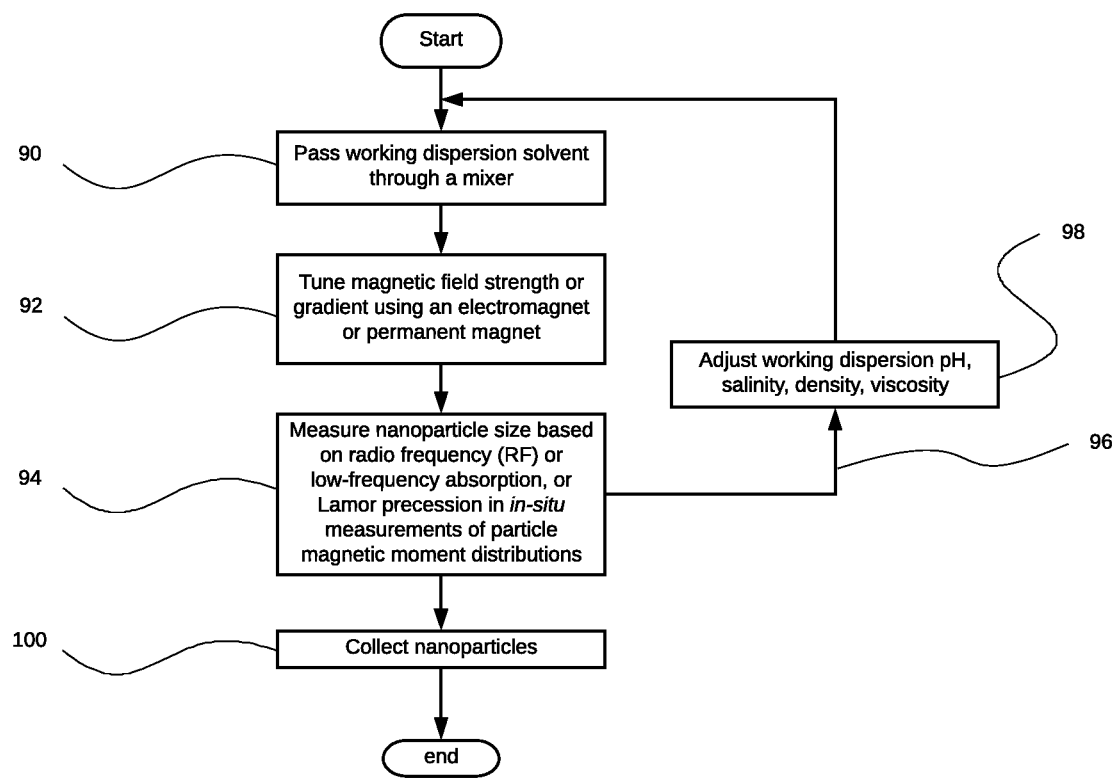
FIG. 4 is a flow chart providing a method for fractionating magnetic nanoparticles.
Figure 5:
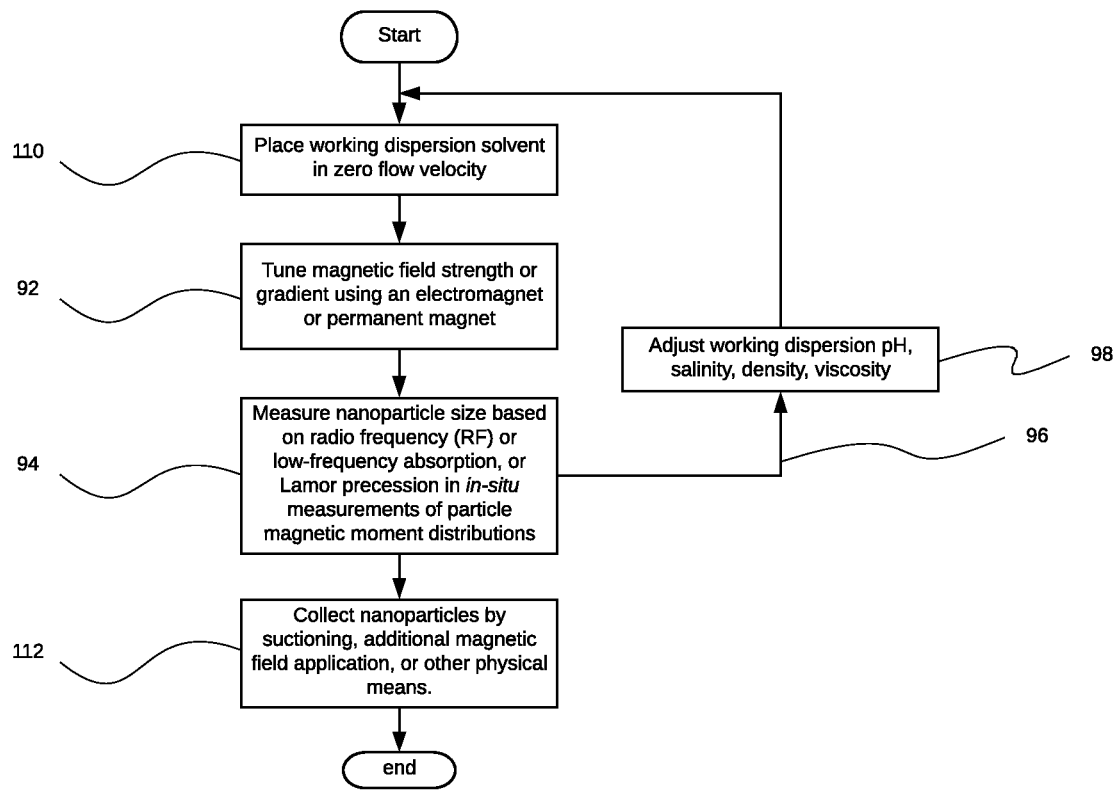
FIG. 5 is another flow chart providing a method for fractionating magnetic nanoparticles.

Referring to FIGS. 4 and 5, FIGS. 4 and 5 both show magnetic fractionation methods for fractionating magnetic nanoparticles or alloying-tuned ferrite nanoparticles. Starting at step 90 in FIG. 4, nanoparticles produced during the manufacturing method shown in FIG. 3 is now considered as a working dispersion solvent and are passed through a mixer. The working dispersion solvent in step 90 may also be nanoparticles produced by other methods. A well-mixed working dispersion 12 may comprise of mixed nanoparticles of different size distributions. In contrast, in step 110 of FIG. 5, the working dispersion solvent or the well-mixed working dispersion 12 is placed in a zero flow velocity container 42. In step 110 where laminar flow velocity is zero, the inherent density and viscosity of the well-mixed working dispersion 12, and therefore the buoyant forces acting on magnetic particles in the well-mixed working dispersion are balanced against a magnetic force. The size distribution of the nanoparticles is realized along an applied magnetic field gradient.

In step 92, the magnetic field strength or gradient may be tuned by increasing the current running through coils 20 as seen in FIGS. 1 and 2 or by replacing the permanent magnet with a stronger or weaker permanent magnetic field strength. Particles in a well-mixed working dispersion 12 feel a drag force to move with laminar flow which is proportional to their effective cross-sectional area or the square of their radius $(d/2)^2$. However, magnetic nanoparticles also possess a total magnetic moment m, which results from a built-in remnant magnetic field, and the strength of this magnetic moment grows as a power law in the particle diameter: $m(d) \sim A(d^a)(ms)$ where A is a constant, d is the particle diameter, a is a power constant (typically a=3), and ms is the material-dependent saturation magnetization. In other words, as the particle volume grows the number of magnetic dipoles increases. It is possible to tune or control magnetic extraction force F and direction against a drag-flow force provided by the working dispersion solvent by tuning the magnetic field strength. Further, since the force on a magnetic dipole from a non-uniform external magnetic field is proportional to the magnetic field gradient: $F=\nabla(m(d)\cdot B)$, tuning magnetic field gradient may also affect the magnetic extraction force.

When a well-mixed working dispersion 12 travels through a mixer and some nanoparticles are extracted based on size, a measurement device may be placed at a size selected component 22 which may be located at the end of a channel of a fractionating region where fractionated nanoparticles 26 may enter. In step 94, nanoparticle sizes are measured by the measurement device. The measurement device may measure nanoparticle size based on radio frequency (RF) or low-frequency absorption. The measurement device may use Lamor precession in in-situ measurements of particle magnetic moment distributions. Laser diffraction (LF) or dynamic light scattering (DLS) may further be used to measure nanoparticle size distributions in non in situ and in situ environments. The measurement device in step 94 may also be placed at the non-fractionated end 32 where the complement population 30 to fractionated nanoparticles end up. In step 100, nanoparticles are collected if measurements of nanoparticle size distributions satisfy a predetermined value. Similarly, in step 112 of FIG. 5, in an alternate geometry such as in zero laminar flow velocity magnetic fractionation, after a desired nanoparticle size distribution is detected by the measurement device, the desired particle distribution may be removed from the working dispersion via suctioning, additional magnetic field application, or by physical means. Those nanoparticles that are not of sufficient size are uncollected can be reintroduced into the system at any step in order to further grow the nanoparticles.

If nanoparticle size distributions do not meet a predetermined value, the fractionated nanoparticles 26 is redirected to step 98 via a feedback control mechanism 96. In step 98 the fractionated nanoparticles 26 is now considered as the well-mixed working dispersion 12 where the pH, salinity, density, viscosity of the well-mixed working dispersion 12 may be adjusted. The adjustment to pH, salinity, density, or viscosity may be additive or subtractive with respect to nanoparticle size distribution measured. The feedback control mechanism 96 may be used in situations where extraction of nanoparticles is time-dependent allowing for feedback control of a potential flow-through particle manufacturing process. The feedback control mechanism 96 may also be used to where multi-stage growth is required, for example, in producing NZFO nanoparticles at the PSD size target of approximately 60 nm in diameter wherein intermediate sized NZFO particles are re-introduced back into precursors, solvent, or a chelator solution which may be subjected to thermal growth again as seen in steps 60, 68, and 74 of FIG. 3.

The apparatus and methods herein provide a new and novel method of producing magnetic nanoparticles at or about 60 nm in diameter. The alloying content can be tuned for radio frequency properties. Further, the disclosed process provides magnetic nanoparticles that can be surface tuned with alloying and oxygen content as well as chemical properties (i.e. ligands).

More generally, the aforementioned methods can produce the magnetic nanoparticles of the form MFe2O4 wherein M includes a plurality of atomic metal species. For example, M can be iron, nickel, zinc, cobalt, manganese, or a mixture of two or more such metals in the 2+ oxidation state. These additional metals can be added to in the aforementioned precursor formulations in which the metal is the chemical cation in the 2+ oxidation state, and the anion is a carboxylate fatty acid.

The apparatus and methods above provide for batch method processing. In addition, continuous flow processing can be implemented. The above described chemistries can be injected into a continuous flow reactor. The magnetic field and associated apparatus can be implemented near the end of the growth or quenching stage before sort. Further, a plurality of magnetic fields and related apparatus can be implement at various stages.

From the description of the present invention provided herein one skilled in the art can implement the method of manufacture in accordance with the present invention. While the present invention has been described in terms of particular examples, others can be implemented without departing from the invention. In summary, the present invention is described above in terms of particular embodiments. The invention, however, is not limited to the embodiments described and depicted herein. Rather, the invention is limited only by the claims appended hereto.

What is claimed is:

1. A method of producing magnetic nanoparticles suitable for additive manufacture, the method comprising:
    providing a solution having a plurality of metallic precursors to produce the magnetic nanoparticles, a coordinating solvent, and a chelating agent;
    mixing and heating the solution to grow nanoparticles wherein the magnetic nanoparticles are formed;
    cooling the solution; and
    applying a magnetic field to the solution, wherein the magnetic nanoparticles are at least partially separated by size.

2. The method of claim 1, wherein the metallic precursors include iron(III) oleate, nickel(II) oleate, and zinc(II) undecylenate.

3. The method of claim 1, further comprising combining the metallic precursors with myristic acid.

4. The method of claim 1, wherein the coordinating solvent is a mixture of 2:1 octadecene to dibenzyl ether, and wherein the chelating agent comprises glycerol, tetraethylene glycol and/or 2,2'-bipyridine.

5. The method of claim 1, wherein mixing and heating the solution includes ramping to a holding temperature at a first rate.

6. The method of claim 5 wherein the first rate is 3 degrees Celsius per minute.

7. The method of claim 5, wherein the holding temperate is 340 degrees Celsius.

8. The method of claim 1, further comprising diluting the solution after cooling the solution.

9. The method of claim 1 wherein the magnetic field is applied across a flow of the solution.

10. The method of claim 9, wherein the flow of the solution is laminar.

11. The method of claim 9, wherein the flow of the solution is separated into a plurality of channels in a region of the magnetic field or fluidically downstream of the region.

12. The method of claim 11, further comprising monitoring the solution.

13. The method of claim 12, wherein monitoring the solution includes monitoring via an RF or low-frequency absorption apparatus.

14. The method of claim 1, wherein the solution is mixed and heated in a continuous flow process.

15. The method of claim 14, wherein the magnetic field is applied in the continuous flow process.

16. The method of claim 1, wherein the magnetic field has variable strength.

17. The method of claim 1, wherein the magnetic field has variable direction.

18. The method of claim 1, wherein the solution provided has already gone through an iteration of the method.

19. The method of claim 1, wherein the magnetic nanoparticles comprise $Ni_{0.5}Zn_{0.5}Fe_2O_4$.

20. The method of claim 1, wherein the magnetic nanoparticles comprise $Ni_xZn_{1-x}Fe_2O_4$.

21. The method of claim 1, wherein the magnetic nanoparticles comprise $MFe_2O_4$ where M includes a plurality of metal species.

22. The method of claim 1, further comprising the step of diluting the solution to a suitable viscosity for inkjet printing.

23. The method of claim 1, wherein the magnetic nanoparticles are 60 to 70 nanometers in diameter.

* * * * *